United States Patent [19]

Kawaguchi et al.

[11] 4,065,419

[45] Dec. 27, 1977

[54] FLUORO-ELASTOMER COMPOSITION HAVING IMPROVED PROCESSABILITY

[76] Inventors: Yoshihiko Kawaguchi, 101-C-13, 1 chome, Momoyamadai, Suita, Osaka, Japan, 565; Yoshimi Harada, 26, Minami Kibogaoka, Asahi, Yokohama, Kanagawa, Japan, 241; Makoto Miki, 1140-162, Imaizumi, Kamakura, Kanagawa, Japan, 247; Kanenari Gouda, 1-18-14, Kaminoge, Setagayaku, Tokyo, Japan, 158; Masaharu Akiyama, 8-7 Sanocho, Yokosukashi, Kanegawa, Japan, 238; Masayuki Tokura, 1193, Isogo, Isogo, Yokohama, Kanagawa, Japan, 235; Jun Kuroha, 4-14-12, Kugayama, Suginamiku, Tokyo, Japan, 168

[21] Appl. No.: 732,750

[22] Filed: Oct. 15, 1976

[30] Foreign Application Priority Data

Oct. 7, 1975 Japan .................................. 50-120330

[51] Int. Cl.$^2$ ............................................ C08L 91/06
[52] U.S. Cl. ............................ 260/28.5 D; 260/42.27
[58] Field of Search ................................. 260/28.5 D

[56] References Cited

U.S. PATENT DOCUMENTS

| | | | |
|---|---|---|---|
| 3,753,937 | 8/1973 | Stivers | 260/28.5 D |
| 3,857,827 | 12/1974 | Dohany | 260/28.5 D X |

OTHER PUBLICATIONS

Chemical Abstracts; vol. 73, 1970; Ref. 132,239b – "Composition of Hard Portion of Crude Rice Bran Wax".

Chemical Abstracts; vol. 78, 1973; Ref. 86276q – "Oil Waxes of Rice Bran of Central Asian Rice".

Primary Examiner—Lewis T. Jacobs

[57] ABSTRACT

Rice-bran wax in the amount of 0.1 to 10 parts by weight per 100 parts of elastomer is added to fluoroelastomers to improve the processability of the fluoroelastomer.

3 Claims, No Drawings

FLUORO-ELASTOMER COMPOSITION HAVING IMPROVED PROCESSABILITY

This invention relates to a fluoro-elastomer composition having improved processability such as extrudability, roll-processability, calender-processability, mold-shapability and the like.

Fluoro-elastomers are known to have excellent heat resistance, chemical resistance, solvent resistance, oil resistance, weatherability and other properties. Because of these characteristic properties, fluoro-elastomers have gained a wide range of applications in various fields of industry including the automobile, aircraft, machine engineering, etc., and been used as, for example, "maintenance-free" functional components such as heat-resistant, oil-resistant O-ring, oil-seal and the like. However, the principal problem with the fluoro-elastomers has been that the elastomers are extremely difficult to process in comparison with multi-purpose-type elastomers such as natural rubber.

In other words, the fluoro-elastomers have scarcely any compatibility with such softening agents or plasticizers that are generally used for the above-mentioned multi-purpose elastomers. It is indeed very difficult to blend the fluoro-elastomers with these softening agents or plasticizers by a kneading roll. Even if they can be blended, the resulting composition tends to cause blooming. Likewise the softening agents or the plasticizers tend to be dissipated during the secondary vulcanization or during the high temperature use of the final product, thereby causing cracks of the product. In addition to these drawbacks, desirable properties of the fluoro-elastomer per se are oftentimes deteriorated due to the softening agents or the plasticizers.

Recently there have been offered several fluoro-elastomers which have considerably improved processability. (For example, "Viton E-60C" of du Pont; "Fluorel" of 3M; "Daiel G601" of Daikin; all trade names). Yet these fluoroelastomers are unsatisfactory in comparison with other multi-purpose rubbers with respect to roll-processability, calender-processability, extrudability and like properties.

The inventors of this invention made intensive studies in search for a method for solving the problems with fluoro-elastomers or blend compositions containing said fluoro-elastomers. As a result, the inventors now found that rice-bran wax is readily miscible with the fluoro-elastomer, and when blended in a small amount, the rice-bran wax affords a fluoro-elastomer composition having extremely improved processability without causing significant adverse effects over the desirable properties of the fluoroelastomer per se.

On the basis of the abovementioned novel finding, the present invention provides a fluoro-elastomer composition having improved processability which comprises a fluoro-elastomer or a vulcanizable composition of said fluoro-elastomer, and 0.1 – 10 parts by weight, based on 100 parts by weight of said fluoro-elastomer or said vulcanizable composition thereof, of rice-bran wax.

The term "rice-bran wax" indicates generally a wax component contained in the rice-bran which can be obtained by extraction using an organic solvent, Examples of the organic solvent used for extraction of the wax component are n-hexane, methanol, ethanol, propanol, isopropanol, toluene, xylene, carbon tetrachloride, acetone, methyl ethyl ketone or mixtures of these solvents. A typical process for the extraction of the rice-bran wax is carried out in the following manner.

The rice-bran is heated in a large amount of n-hexane, and a n-hexane-soluble portion is extracted at a temperature near the boiling point of the solvent. Then, the resulting extract is cooled down to 5° C., and left standing over a period of 24 hours. The precipitate (about 1% by weight of the amount of the rice-bran) is recovered.

After isopropanol is added to the precipitate, the mixture is refluxed by heating at 75° C. for about three hours, and dark brown gummy insoluble components are removed by means of hot suction-filtration. The filtrate is cooled gradually down to 20 - 45° C. and maintained at that temperature for 24 hours. When the precipitate is recovered and then dried in vaccuo, rice-bran wax is obtained as a pale yellow waxy substance having a melting point of about 30° C. The wax thus obtained accounts for about 0.15 – 0.2% by weight based on the weight of the starting rice-bran.

The term "fluoro-elastomer" indicates flurorinecontaining polymers that form an elastomer by vulcanization. These fluorine-containing polymers can be obtained by copolymerizing vinylidene fluoride ($VF_2$) with at least one fluorine-containing monomer which is copolymerizable with vinylidene fluoride.

Examples of the fluorine-containing monomer copolymerizable with the vinylidene fluoride are hexafluoropropene (HFP), tetrafluoroethylene (TFE), perfluoroalkylvinyl ethers having an alkyl group of 1 to 4 carbon atoms, chlorotrifluoroethylene, 1,2,3,3,3-pentafluoropropylene, trifluoroethylene, dichlorodifluoroethylene, fluorinated vinyl esters and the like. Small amounts of bromotrifluoroethylene or 4-bromo-3,3,4,4,-tetra fluorobutene-1 may also be copolymerized with the other monomers listed. Fluoroelastomers containing these bromo units are more readily cured with peroxide.

The fluoro-elastomer of the present invention also includes those fluoro-elastomers which contain a vulcanization accelerator such as polyol, hydroquinone, etc. which accelerates the vulcanization of the elastomers.

The term "vulcanizable composition of the fluoro-elastomer" denotes a blend composition which can form a vulcanized fluoro-elastomer upon vulcanization. The composition consists of the abovementioned fluoro-elastomer, a vulcanizing agent, and proper amounts of various adjuvants, if required, such as a vulcanization accelerator, a metal compound, a stabilizer, a filler, and a coloring agent. These components for the blend composition are known and used conventionally in the art, and available commercially on the market. Specific examples of these components are illustrated in the paragraphs to follow.

As examples of the vulcanizing agent, mention can be made of peroxides, amine-type reagents, reagents not containing an amine, and other agents.

Examples of the metal compound are (1) basic oxides of divalent metals such as MgO, ZnO, PbO, CaO, BaO and/or basic hydroxides of metals such as $Mg(OH)_2$, $Ca(OH)_2$, $Ba(OH)_2$, etc. and (2) mixtures of said oxides and/or said hydroxides plus metal salts of weak acids. Examples of the metal salts of the weak acids are stearates, benzoates, carbonates, oxalates and phosphites of Ba, Na, K, Pb, Ca, etc., and these metal salts of the weak acids account for about 1 – 70% by weight of said mixture, and about 1 – 15 parts by weight per 100 parts by weight of said fluoro-elastomer composition. The abovementioned metal compounds may be used either alone or in combination.

Aging resistors or antioxidants usually blended to rubbers can be added.

Depending upon the intended application, various fillers may also be incorporated, such as carbon black, silica powder, talc, calcium carbonate, clay, titanium oxide, barium sulfate and the like.

The abovementioned fluoro-elastomer per se or the vulcanizable composition thereof is disclosed, for instance, in Japanese Patent Publications Nos. 7394/58, 3495/61, 2185/71, Japanese Laid-Open Patent Publication No. 191/72, U.S. Pat. No. 3,318,854, U.S. Pat. No. 2,968,459, Japanese Laid-Open Patent Publication No. 74106/72 and so on. They are also available commercially on the market in the tradenames such as "Viton" (from du Pont), "Fluorel" (from 3M), "Daiel" (from Daikin Kogyo), etc.

The blend composition in accordance with the present invention consists of the abovementioned fluoro-elastomer or the vulcanizable composition of said elastomer, and 0.1 - 10 parts by weight, based on 100 parts by weight of the fluoro-elastomer, of the rice-bran wax.

Unlike a plasticizer and softening agent used generally or natural rubber and other multi-purpose rubbers, the rice-bran wax has a good compatability with the fluoro-elastomer, and hence, it is readily miscible therewith. Moreover, it does not cause blooming after mixing. In mixing the rice-bran wax into the vulcanizable composition, the wax can be blended in the fluoro-elastomer in advance. Likewise the wax can be added to the composition at any desired stages such as during or after the synthesis of the composition.

The rice-bran wax can be applied in any desired form such as solid, powder, emulsion, solution, melt and so forth and in accordance with any customary methods of adding, mixing and blending such as spraying, coating, kneading or combinations of these methods.

Addition of the rice-bran wax exhibits the action to extremely improve dispersion of a metal compound (an acid acceptor) and a filler in a masticated raw batch of the composition. The addition of the rice-bran wax is also advantageous in that even if a temperature of the masticated raw batch accidentally elevates to an abnormally high temperature, such as, for example, up to 100° C., the raw batch does not stick to the surface of a kneading roll, thereby assuring a smooth cutting operation of the raw batch and shortening the time required for cutting operation.

The masticated raw batch blended by the rice-bran wax has a good flowability. For this reason, the masticated raw batch is especially effective for use in transfermolding or injection-molding, and contributes to improve productivity. In molding operation, the rice-bran wax in the raw batch serves as an internal lubricant and at the same time, as a mold releasing agent, and facilitates easy removal of a shaped article from the mold. It also mitigates staining of the mold.

As mentioned above, the rice-bran wax exhibits excellent internal and external lubricating effects inside the composition. Nonetheless, the rice-bran wax does not exert any adverse effects over the properties of the raw batch such as knitting and vulcanization bondability to metals. The presence of the rice-bran wax also acts to prevent mutual coalescence of unvulcanized raw batches at room temperature.

Because the composition containing the rice-bran wax does not stick to the surface of a roll in practising the calendering operation, the roll temperature can be maintained at a temperature higher than conventionally used during the calendering operation. Hence, there can be readily produced a thin sheet (for example, 0.2mm-thick) having a good surface texture and less shrinkage.

Of the improvements of the processability ensured by the addition of the rice-bran wax, an especially great advantage is the improvement in extrusion-processability of the composition. A raw batch of conventional fluoro-elastomer has a poor flowability and a large internal exothermy. For this reason, extrusion-processing of the raw batch of a conventional fluoro-elastomer calls for skilled workmanship. In ordinary molding operation in general where no such skill is required, therefore, assisting agents for extrusion-processing such as a paraffin wax, an ester-type plasticizer, fluoro-silicon and the like are employed to improve the extrusion-processability of the composition at the expense of properties of a resulting molded article.

In comparison therewith, the present composition which contains a small amount of the rice-bran wax makes it possible to effect extrusion-processing without the aid of these assisting agents, and consequently, without sacrificing the properties of the molded article.

In other words, by simply maintaining a die temperature at about 70 – 90° C., there can be obtained an extruded article having an extremely good surface flatness and edge accuracy without being substantially affected by a length-to-diameter ratio (L/D) or a barrel temperature of an extruder.

Principal effects and advantages brought about by the addition of the rice-bran wax have been explained in the foregoing paragraphs. These effects and advantages are provided by the novel blend composition in accordance with the present invention wherein 0.1 – 10 parts by weight of the rice-bran wax is added, on the basis of 100 parts by weight of the fluoro-elastomer or the vulcanizable composition of said fluoro-elastomer. When the amount of the rice-bran wax is not greater than 0.1 parts by weight, the contemplated object of the invention can not be accomplished sufficiently. When it exceeds 10 parts by weight, on the other hand, properties of the composition after vulcanization tend to be affected adversely. Hence, an especially preferred amount of the rice-bran wax is in the range from about 0.5 to 3 parts by weight. Superior results are often obtained when using 1.5 to 3 parts by weight ricebran wax. Fluoro-elastomers containing bromo-containing units such as bromotrifluoroethylene, or 4-bromo-3,3,4,4-tetrafluorobutene-1 usually process best with about 1 to 5 parts of ricebran wax.

In addition to the use as a raw batch for molding, the composition of the present invention can also be used for various other applications such as a paint, an impregnated article, an adhesive, and so forth.

The term "part" used in the Examples represents "part by weight" unless specified otherwise.

In each Example, the principal blending proportion is as follows;

| | |
|---|---|
| 100 parts | fluoro-elastomer ("Viton E60C", a product of du Pont Co.); |
| 3 parts | magnesia; |
| 30 parts | carbon black; |
| 6 parts | calcium hydroxide. |

The abovementioned components are kneaded by a small roll-mill equipped with a cooler which is set at a predetermined temperature.

Properties of each compositions are compared with respect to stickiness at roll-kneading, extrusion-processability and die-expansion rate.

Extrusion-processability by a Garvey die is measured using a 50 m/m extruder having a L/D of 10/1 and a number of rotation of 18 rpm, under the following conditions;

| die temperature | 90° C.; | head temperature | 80° C.; |
|---|---|---|---|
| barrel temperature | 40° C.; | screw temperature | 20° C.; |

Measuring accuracy of the die expansion (%) is about ± 5%.

|  | Comparative Example | Example | | | | | |
|---|---|---|---|---|---|---|---|
|  | 1 | 1 | 2 | 3 | 4 | 5 | 6 |
| Fluoro-elastomer content in the composition | 100 | 100 | 100 | 100* | 100 | 100 | 100** |
| Rice-bran wax | 0 | 0.1 | 0.5 | 2.0 | 10*** | 1.5 | 2.5 |
| Roll-stickiness |  |  |  |  |  |  |  |
| (i) 50° C. | little | no | no | no | no | no | no |
| (ii) 80° C. | yes | no | no | no | no | no | no |
| Garvey die extrusion-processability |  |  |  |  |  |  |  |
| Surface flatness | poor | good | excellent | excellent | excellent | excellent | excellent |
| Edge accuracy | " | " | " | " | " | " | " |
| Die expansion (%) | 32 | 32 | 35 | 35 | 33 | 35 | 31 |

REMARKS:
*Mixture system consisting of 80 parts of "Viton E60C" and 20 parts of "Viton B".
**Mixture system consisting 85 parts of "Viton E60C" and 15 parts of "Viton A".
***4 Parts of the rice-bran wax is added to the blend consisting of 100 parts of "Viton E60C" and 6 parts of the rice-bran wax.

|  | Comparative Example 2 | Example 7 |
|---|---|---|
| Fluoro-elastomer content in the composition | 100*4 | 100*4 |
| Rice-bran wax | 0 | 1.5*5 |
| Roll-stickiness |  |  |
| (i) 30° C. | little | no |
| (ii) 80° C. | yes | no |
| Garvey die extrusion-processability |  |  |
| Extruded Amount (cm/min.) | 114 | 243 |

REMARKS:
*4Mixture system consisting of 70 parts of "Viton E 430" and 30 parts of "Viton AHV".
*5Of 1.5 parts of the rice-bran wax, 0.43 parts is added to "Viton E 430" in advance.

In comparison with the blend composition not containing the rice-bran wax, the rice bran wax-containing compositions in Examples 1 through 7 exhibit remarkably improved processability while their vulcanization results are by no means inferior.

For instance, the composition of Example 7 is first press-vulcanized at 175° C. for 15 minutes, and then oven-vulcanized at 230° C. for 24 hours. As a result, the vulcanizate exhibits the following properties;

| tensile strength | 145 Kg/cm$^2$ |
|---|---|
| elongation | 270% |
| JIS hardness | 76 |
| oil resistance | 3% (swelling of volume at 175° C. for 70 hours) |
| Compression permanent set | 46% (at 200° C. for 14 days) |

After the vulcanizate is further aged at 270° C. for 70 hours, it exhibits the following properties;

| tensile strength | 50 Kg/cm$^2$ |
|---|---|
| elongation | 137% |
| JIS hardness | 82 |

Comparative Example 3 and Example 8

Vulcanizable compositions were prepared by blending

```
100 parts  - VF2/HFP/TFE/BTFE fluoroelastomer*
 30 parts  - carbon black
  3 parts  - sublimed litharge (PbO)
2.5 parts  - organic peroxide (Luperco 130 - XL)
2.5 parts  - triallylisocyanurate
0 or 2 parts - rice-bran wax
```

*45 weight percent vinylidene fluoride (VF$_2$)
29.2 weight percent hexafluoropropene (HFP)
25 weight percent tetrafluoroethylene (TFE)
0.8 weight percent bromotrifluoroethylene (BTFE)

Each of the compositions was extruded through a tubing die having an inside diameter of 6.2 mm and an outside diameter of 9.4 mm with a screw speed of 20 rpm under the following condition.

| die temp. = 88° C. | head temp. = 66° C. |
|---|---|
| barrell temp. = 49° C. | screw temp. = 24° C. |

The tubing made from the composition without rice-bran wax had a very rough surface while the tubing containing rice-bran wax had a very smooth surface.

We claim:

1. A composition comprising a fluoro-elastomer and 0.1 to 10 parts by weight based on 100 parts by weight of the fluoro-elastomer of rice-bran wax.

2. A vulcanizable fluoro-elastomer composition containing 0.1 to 10 parts by weight, based on 100 parts by weight of the vulcanizable fluoro-elastomer composition of rice-bran wax.

3. The composition of claim 1 in which the rice-bran wax is present in the amount of 0.5 to 3 parts by weight.

* * * * *